United States Patent [19]

McArdle et al.

[11] Patent Number: 5,200,238

[45] Date of Patent: Apr. 6, 1993

[54] LIQUID CRYSTAL DISPLAY DEVICES AND METHOD OF MANUFACTURE

[75] Inventors: Ciaran B. McArdle, Dublin, Ireland; John G. Woods, Farmington; Anthony F. Jacobine, Meriden, both of Conn.

[73] Assignee: Loctite (Ireland) Limited, Dublin, Ireland

[21] Appl. No.: 766,492

[22] Filed: Sep. 25, 1991

Related U.S. Application Data

[63] Continuation-in-part of Ser. No. 542,466, Jun. 22, 1990, abandoned.

[51] Int. Cl.$^5$ .............................................. C09K 19/00
[52] U.S. Cl. ...................................... 428/1; 428/447; 427/77; 427/78; 427/240; 427/558; 359/75; 359/76; 359/77; 359/78; 252/299.01
[58] Field of Search ................... 428/1, 447; 427/54.1, 427/77, 78, 240; 359/75, 76, 77, 78; 252/299.01

[56] References Cited

U.S. PATENT DOCUMENTS

| | | | |
|---|---|---|---|
| 4,341,445 | 7/1982 | Matsuyama et al. | 350/344 |
| 4,586,791 | 5/1986 | Isogai | 359/76 |
| 4,618,514 | 10/1986 | McClelland et al. | 428/1 |
| 4,662,721 | 5/1987 | Harada et al. | 350/339 R |
| 4,838,658 | 6/1989 | Zondler | 428/1 |
| 4,914,004 | 4/1990 | Kohler et al. | 430/262 |
| 5,024,850 | 6/1991 | Broer et al. | 428/1 |
| 5,061,509 | 10/1991 | Naito | 427/54.1 |

FOREIGN PATENT DOCUMENTS

| | | |
|---|---|---|
| 062833 | 3/1980 | Japan. |
| 136625 | 2/1981 | Japan. |
| 170937 | 7/1987 | Japan. |

Primary Examiner—Ellis P. Robinson
Assistant Examiner—Nasser Ahmad
Attorney, Agent, or Firm—Edward K. Welch, II; Eugene F. Miller

[57] ABSTRACT

A method of forming liquid crystal alignment layers of high tilt angle, said method comprising preparing a polymeric film of a monomer of the formula IV:

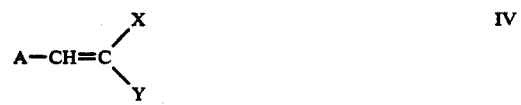

wherein X and Y are strong electron withdrawing groups, optionally substituted with or containing Si or Ti, and A is —H or —CH=CH$_2$ or, provided that X and Y are both —CN, A may be —R$^2$ or —CH=CHR$^2$ wherein R$^2$ is hydrocarbyl, aryl or alkaryl; exposing said polymeric film to ultraviolet radiation for sufficient period of time to photochemically modify the polymer and, thereafter, subjecting the modified polymer to a heat treatment in the range of 100°–400° C. for at least 5 seconds.

20 Claims, 2 Drawing Sheets

SPECTRAL OUTPUT OF NEW UVALOC 1000

ABSORPTION SPECTRUM OF PECA FILM

LIQUID CRYSTAL DISPLAY DEVICES AND METHOD OF MANUFACTURE

CROSS REFERENCE TO RELATED APPLICATIONS

This application is a continuation-in-part of U.S. patent application Ser. No. 07/542,466, filed on Jun. 22, 1990, now abandoned. This application is related to U.S. patent application Ser. No. 07/542,465, filed Jun. 22, 1990, entitled "Photoresists Formed by Polymerization of Di-Unsaturated Monomers," and application Ser. No. 07/542,464, filed Jun. 22, 1990, entitled "Anionically Polymerizable Monomers, Polymers Thereof, and Use of Such Polymers in Photoresists," both of which are incorporated herein by reference.

BACKGROUND OF THE INVENTION

1. Field of the Invention

This invention relates to a method of manufacturing liquid crystal display devices, particularly the alignment layers thereof, and to the liquid crystal display devices and alignment layers prepared by said method.

2. Description of the Related Art

Liquid crystal display (LCD) devices are well known. Optoelectronic devices of this kind generally comprise a cell in which a liquid crystal composition is housed in a cell spaced between two polymeric alignment layers, each supported on an optically transparent electrode which in turn is supported on a transparent plate; e.g., a glass plate.

While a number of resins and resin systems may be employed as the alignment layer (for example, polyvinyl alcohol, acrylate esters, cyanoacrylates, thermosetting unsaturated polyesters, celluloses, polyamides, polyimides and the like), the most commonly used polymer for the alignment layer is a polyimide. Generally, such alignment layers are formed by applying a solution of the polymer resin in a solvent to the substrate electrode. Thereafter, the solvent is removed (e.g., by evaporation), and the coating baked for several hours to complete the removal of the solvent and formation of the resin film. Thereafter, the surface of the alignment layer is then conventionally rubbed utilizing a flannel cloth or buffing wheel so as to generate the alignment characteristic of the resin. In the liquid crystalline display device, the rubbed surface of the alignment layer causes the liquid crystal molecules to adopt a small angle relative to the surface of the alignment layer. This "tilt angle" is usually of the order of 1°–3°.

In the preparation of a polyimide alignment layer, for example, a solution of the polyimide resin in an organic solvent (e.g., 16% polyimide in N-methyl pyrrolidone) is applied by spin-coating onto the surface of the electrode. The solvent is removed by evaporation and the coating allowed to dry on the surface. Usually, the coating is baked at high temperatures (e.g., 200°–300° C.) for several hours to complete the removal of the solvent and the formation of the resin film. This process is usually operated as a bath-wise process because of the need to wait for curing of the alignment layer. Finally, the cooled resin alignment layer is then rubbed unidirectionally to provide the alignment characteristic to the layer. The resultant alignment layer generally will provide a "tilt angle" in liquid crystalline molecules on the order of 2°–3°.

While tilt angles on the order of 1°–3° are acceptable for general use, special high tilt angles are required for the more advanced, special high-tech liquid crystalline display devices employing the helix or supertwist and chiral technologies, especially the 270° Supertwist Birefringence Effect technologies. Such technologies generally need tilt angles on the order of 5°–14°, preferably 7°–14° and higher. Various methods are being sought and suggested for enhancing the tilt angle, especially with respect to polyimide alignment layers. Such methods are taught in "Surface Alignment of Liquid Crystals by Rubbed Polymer Layers" by A. Mosley et al., DISPLAYS, January 1987, p. 17. Additionally, improved tilt angles have also been achieved through the development of specialized electronic grade polyimides; however, such polyimides are very costly, on the order of about $1,000/kilogram for a 15% solution. Furthermore, because of the inherent waste associated with spin-coating, the cost of manufacturing such liquid crystalline display devices becomes prohibitively expensive.

In addition to specialized polyimides, others have developed or identified resin systems suitable for use as liquid crystalline alignment layers which provide enhanced tilt angles. For example, in European Patent Publication EP 0,177,271, Imperial Chemical Industries PLC describes liquid crystalline alignment layers comprising a polyphenylene polymer. Such alignment layers are applied by spin coating from a solution and result in tilt bias angles of between 5°–15°.

While the art has identified new methods and materials for the development of improved liquid crystalline alignment layers, generally all of such methods and materials still employ a spin-coating process. Although the spin-coating process has been used for some time and is fairly simple to employ and practice, it is time consuming, wasteful and inconsistent. Specifically, such processes are especially time consuming with respect to the preparation of the solution, the application of the solution to the substrate, the time needed for allowing the solvent to evaporate and the solution coating to dry on the surface and the subsequent bake operation. Furthermore, while such an operation is suitable for coating small substrates, it is particularly ineffective for providing a uniform coating over a large substrate area. Because of the nature of spin-coating, while coating uniformity tends to be fairly consistent in the center region, as one moves further from the center of the substrate surface, such consistency is lost, particularly in the peripheral regions. Such a result is particularly problematic in large area displays (e.g., European A4 size manufacture) and substrates, therefor, are often deliberately made oversized so that they may subsequently be trimmed following the coating/curing process to cut out that substrate surface having the most uniform coating thickness. As a result, there is a tremendous amount of waste of both the coating solution, as well as the underlying substrate materials. Other shortcomings of the spin-coating process are the possibility of the introduction of contaminants through the solvent to the coating resin itself. Finally, given the continuing trend and movement for environmentally safe and healthy processing, there is a growing desire for elimination of solvents in manufacturing processes.

U.S. Pat. No. 4,038,441 to Dubois describes a method of manufacturing a liquid crystal display device in which an organic polymer deposit is formed upon the internal faces of two electrode-carrying plates by directing onto them, at a very low angle of incidence, a monomer vapor flow. Suitable monomers which have the property of polymerizing from the vapor phase include methyl acrylate, methyl methacrylate, vinyl monomers, silanes, chlorosilanes and siloxanes. The deposition is carried out in a cylindrical enclosure of vitreous silica, the enclosure being surrounded at its central portion by a heater resistor and having a mounting arrangement therein for the substrates. While this process overcomes many of the objections for spin-coating, as mentioned above, it involves a special piece of apparatus and requires high temperatures (e.g., 240° C.) for the deposition of vinyltrichlorosilane.

It is known that cyanoacrylate monomers can be deposited onto a substrate from vapor. U.S. Pat. No. 4,675,273 (Woods et al.), assigned to Loctite (Ireland) Limited, incorporated herein by reference, describes a method for applying a polymeric resist coating to a substrate which comprises exposing the substrate to be coated to the vapor of an anionically polymerizable monomer of the formula I:

$$CHR=CXY \qquad I$$

wherein X and Y are strong electron withdrawing groups and R is H or, provided that X and Y are both —CN, R may be $C_1$–$C_4$ alkyl, for sufficient time to deposit a polymerizable coating thereon. The monomer condenses and polymerizes on the surface of the substrate to give a highly uniform high molecular weight polymeric coating which is useful as a resist coating in lithographic process. U.S. patent application Ser. No. 07/542,465, filed Jun. 22, 1990, entitled "Photoresists Formed by Polymerization of Di-Unsaturated Monomers," describes a similar method using vapor of a substituted butadiene monomer of the formula II:

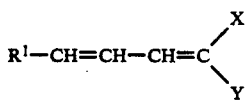

wherein X and Y are as defined above and $R^1$ is H or, providing that X and Y are both —CN, $R^1$ may be aliphatic hydrocarbyl, aryl or alkaryl.

U.S. patent application Ser. No. 07/542,464, filed Jun. 22, 1990, entitled "Anionically Polymerizable Monomers, Polymers Thereof, and Use of Such Polymers in Photoresists," describes anionically polymerizable monomers of the formula III:

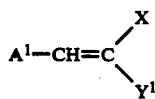

wherein $A^1$ is —H or —$CH=CH_2$; X is as defined above; and $Y^1$ is a strong electron withdrawing group containing at least one silicon or titanium atom. That Application also describes polymeric resist coatings formed by vapor deposition of a monomer of formula III.

Although cyanoacrylates have found utility as liquid crystal alignment layers, their use as such has not been without shortcomings. Generally, liquid crystal alignment layers formed from cyanoacrylates prepared through the spin-coating process manifest many of the misgivings described above with respect to the spin-coating process in general. Additionally, such liquid crystal alignment layers typically have tilt angles of less than 2°. While vapor deposition of such cyanoacrylate and cyanoacrylate derivative monomers will overcome many of the misgivings of spin-coating, the tilt angle of such liquid crystal alignment layers nevertheless remains less than 2°.

It is, therefore, an intent of the present invention to provide a new method for the preparation of liquid crystal alignment layers having high tilt angles. In the preferred embodiment, it is the intent of the present invention to provide such high tilt angle liquid crystal alignment layers without the misgivings of a spin-coating process.

SUMMARY OF THE INVENTION

It has now been found that liquid crystal alignment layers having high tilt angles may be formed by a process which comprises applying a film of a liquid crystal alignment resin to the surface of the electrode substrate, subjecting the so-formed liquid crystal alignment layer film to ultraviolet light to photochemically modify the same and, thereafter, subjecting the coated electrode to heat treatment in order to prepare a liquid crystal alignment layer which imparts a high tilt angle to the liquid crystalline materials. While the liquid crystal alignment layer may be applied to the electrode substrate by spin-coating, it is especially desired to apply the same through vapor deposition. The liquid crystal alignment layers formed in accordance with the practice of the present invention have associated therewith tilt angles on the order of about 5°–10° or more.

DESCRIPTION OF THE DRAWINGS

The invention will be further described with reference to the accompanying drawings.

As shown in FIG. 2, the device comprises a pair of glass plates (1) each carrying a layer of transparent electrode (2), onto which an alignment layer (3) has been deposited from a monomer of formula IV. The cell is defined between the alignment layers by spacers (4). The cell is filled with liquid crystal composition (5).

DETAILED DESCRIPTION OF THE PREFERRED EMBODIMENT

Figure 1A:
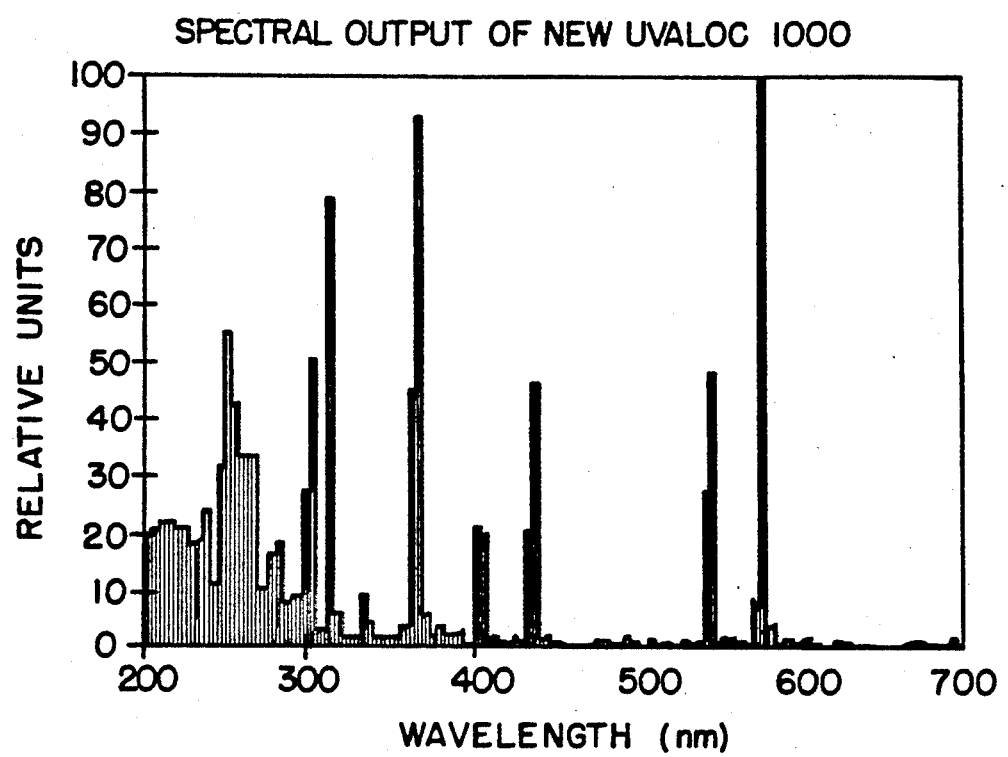
FIG. 1a is a diagram of the emission spectrum for a UVALOC TM lamp.

The liquid crystal alignment layer produced in accordance with the process of the present invention is derived from a polymer of a monomer of the formula IV:

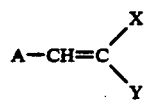

wherein X and Y are strong electron withdrawing groups and A is —H or —$CH=CH_2$ or, provided that X and Y are both —CN, A may be —$R^2$ or —$CH=CHR^2$ wherein $R^2$ is a $C_1$–$C_{20}$ hydrocarbyl, aryl or alkaryl, preferably a $C_1$–$C_{20}$ alkyl. Such monomers have been described previously with respect to the discussions of copending U.S. patent application Ser. Nos. 07/542,464 and 07/542,465, filed on Jun. 22, 1990, as being useful as resist coatings.

The term "strong electron withdrawing groups" refers to groups which are as electron withdrawing or preferably more electron withdrawing than halo; i.e., fluoro or chloro. Generally, X and Y may be independently selected from —CN, —COR$^3$, —COOR$^4$, —SO$_2$R$^4$ and —SO$_3$R$^4$ wherein R$^3$ is H or a hydrocarbyl group, preferably a C$_1$–C$_{12}$ hydrocarbyl group, and R$^4$ is a hydrocarbyl or substituted hydrocarbyl group such as a straight chain or branched chain C$_1$–C$_{12}$ alkyl group (which may be substituted with a substituent such as a halogen atom or an alkoxy group), a straight chain or branched chain C$_2$–C$_{12}$ alkenyl group, a straight chain or branched chain C$_2$–C$_{12}$ alkynyl group, a cycloalkyl group, an aralkyl group or an aryl group, or R$^3$ or R$^4$ may optionally comprise or be substituted with a group containing Si or Ti. R$^4$ may suitably be a group having at least one chiral center carbon atom. Preferably X is —CN and Y is —COOR$^4$.

When used herein, the term "hydrocarbyl" is intended to mean aliphatic hydrocarbyl including alkyl, alkenyl and alkynyl. Unless otherwise indicated, hydrocarbyl groups shall preferably contain from 1 to 10 carbon atoms, more preferably from 1 to 5 carbon atoms, and aryl and hydrocarbylaryl groups shall preferably have from 6 to 20 carbon atoms, more preferably from 6 to 10 carbon atoms.

Specific examples of the groups for R$^4$ are a methyl group, an ethyl group, an n-propyl group, an isopropyl group, and n-butyl group, an isobutyl group, a pentyl group, a hexyl group, an allyl group, a methallyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group and a 2-ethoxyethyl group, optionally substituted with Si or Ti.

As inferred above, R$^3$ or R$^4$ may suitably comprise or be substituted with at least one group consisting of or containing:

wherein R$^{2a}$, R$^{3a}$ and R$^{4a}$, which may be the same or different, are selected from H (provided that not more than one of R$^{2a}$, R$^{3a}$ and R$^{4a}$ is H), C$_1$–C$_{10}$ alkyl, aryl, C$_1$–C$_{10}$ alkoxy and siloxy groups of the formula:

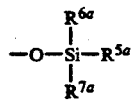

wherein R$^{5a}$, R$^{6a}$ and R$^{7a}$, which may be the same or different, are selected from H, CH$_3$ or phenyl, provided that not more than one of R$^{5a}$, R$^{6a}$ and R$^{7a}$ is H;

and wherein R$^{2a}$ may also be a group selected from siloxane oligomers or polymers of the structure:

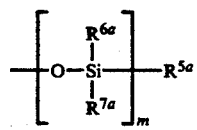

wherein R$^{5a}$, R$^{6a}$ and R$^{7a}$ are defined as above and m is 2 or 3, preferably 2; provided that the monomer with such substituent(s) has significant vapor pressure or can be heated to generate vapor pressure without decomposition.

According to this aspect of the invention, Y is preferably:

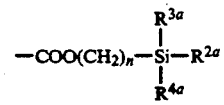

wherein n is 1–5 and R$^{2a}$, R$^{3a}$ and R$^{4a}$ are as defined above, Preferably, n is at least 3, and R$^{2a}$, R$^{3a}$ and R$^{4a}$ are C$_1$–C$_{10}$ alkyl. A particularly preferred monomer is 3-trimethylsilylpropyl-2-cyanoacrylate of the formula:

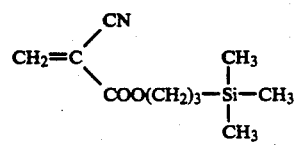

whose preparation is described in the above-mentioned U.S. patent application Ser. No. 07/542,464.

Particularly preferred monomers for use in the practice of the present invention are the 2-cyanoacrylate esters, especially those of the formula:

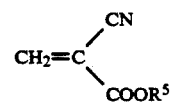

wherein R$^5$ is a C$_1$–C$_5$ alkyl or C$_2$–C$_5$ alkenyl group. Ethyl, allyl and isobutyl cyanoacrylates are especially preferred.

In one embodiment of the present invention, the liquid crystal alignment layer may be prepared and formed on the substrate electrode by conventional spin-coating techniques. In this respect, a solution comprising a polymer resin prepared from the monomer of formula IV above in an appropriate solvent is applied by spin-coating onto the electrode substrate surface. Following application of the solution to the surface, the solvent carrier is allowed to evaporate, leaving a dry polymeric film on the substrate surface. Concurrently or subsequent to the drying step, the substrate may be placed in an oven and subjected to high temperatures, but not so high as to approach the glass transition temperature of the polymer or to cause depolymerization/degradation of the polymer, to force the complete removal of the solvent carrier. The resultant polymeric coated substrate electrode is then rubbed to impart the orientation characteristic to the alignment layer.

Alternatively, and preferably, the liquid crystal alignment layer may be formed on the substrate electrode through vapor deposition. Such vapor deposition of the monomer may be carried out in the manner described in U.S. Pat. No. 4,675,273 (Woods et al.), which is incorporated herein by reference. Generally, the monomer vapor may be generated from the monomers at ambient temperatures and pressures; however, it is preferred to heat the monomer slightly (e.g., to not more than 75° C.) and/or reduce the atmospheric pressure above the monomer generated in the chamber in order to generate sufficient concentrations of vapor to accomplish the vapor deposition on the substrate in a reasonable time.

In practice, the surface of an electrode layer is exposed to the vapor of a monomer of the formula IV, as defined above, for sufficient time to deposit a polymerized coating of the monomer on the electrode. This method can typically be carried out on a semi-continuous basis in a short period of time; e.g., 3 minutes.

The process of the present invention is suitable for electrode layers, and their substrates, which are conventional in the art. Generally, the electrode layer will be of transparent conductive material such as indium tin oxide. Alternatively, the electrode may be of reflective material such as aluminum, silver or gold. The substrate will generally be a transparent plate; e.g., of glass.

If the electrode surface is inherently active for inducing anionic polymerization of the monomers of formula IV, no surface treatment will be necessary to obtain the desired high molecular weight uniform coatings. However, where the electrode surface is slightly acidic or neutral, it is necessary to activate the surface with a basic liquid or vapor which is substantially removed before exposing the electrode to the monomer vapor. Suitable activators include the known initiators for anionic or zwitterionic polymerization of alkyl cyanoacrylates. Especially suitable activators are organic amines and phosphines, particularly as exemplified in U.S. Pat. No. 4,675,273 (Woods et al.).

The alignment layers of the present invention may be rubbed by techniques which are conventional in the LCD art.

Although the liquid crystal alignment layers so formed may be used in the preparation of liquid crystal display devices, such devices often manifest relatively poor thermal resistance and, more importantly, low tilt angles. It has not been found that a subsequent post treatment of the polymeric liquid crystal alignment layer on the substrate will result in improved thermal resistance and, more importantly, high tilt angle.

In accordance with the practice of the present invention, the liquid crystal alignment layer coated electrodes, prepared in accordance with the description above, are next subjected to UV light and, thereafter, heated. Specifically, the formed liquid crystal alignment layer is irradiated with the UV light to photochemically modify the polymer. Such polymer modification is typically obtained with a standard UV light source within a period of from 0.1 seconds to 5 minutes, depending upon the intensity of the lamp itself. Such irradiation may be accomplished by exposing the polymeric surface to the UV light or the liquid crystal alignment layer may be irradiated from its under side, provided that the electrode substrate is transparent to UV irradiation.

Following irradiation, the electrode is then subjected to a heat treatment to complete the rearrangement of the liquid crystal alignment layer polymer. Generally, the heat treatment is carried out at a temperature in the range of 100°–400° C., preferably 200°–350° C., most preferably 250°–350° C., for at least 5 seconds.

The resultant liquid crystal alignment layer will generally have a tilt angle on the order of from about 5°–10°. It is noted that the UV light and heat treatment of the liquid crystal alignment layer causes a loss of volume in the alignment layer itself, mainly due to polymer breakdown and evaporation of the monomer. Generally, though, the thickness of each alignment layer, which may be the same or different, will vary from 50–20,000Å, preferably from 100–500Å. The liquid crystal alignment layer coated electrode, prepared in accordance with the practice of the present invention, may then be used to construct liquid crystalline display devices in accordance with conventional methods of manufacture. It should be noted that the liquid crystal display devices of the present invention are applicable not only to twisted nematic cell devices, but also to other types of LCD devices such as as Chiral Smectic C devices.

The process of the present invention is further illustrated by reference to the following non-limiting examples.

EXAMPLE 1

Clean glass plates of approximately 40 mm × 20 mm coated on one side only with Indium Tin Oxide (ITO) were used to construct a liquid Crystal Device (LCD). The ITO surface was treated with activator (10% tetramethylene diamine in hexamethyldisilazane) as described in U.S. Pat. No. 4,675,273 (Woods et al.). The activator was brushed uniformly across the surface and allowed to evaporate. The polymeric alignment layer was applied by vapor deposition at ambient pressure and at about 50° C. from cyanoacrylate monomer in a fashion similar to that described in U.S. Pat. No. 4,675,273 (Woods et al.). Thus, ethylcyanoacrylate contained in a polypropylene beaker was slightly heated (50° C.) whilst stirring. Over the top of the beaker was placed a lid, mounted on the inside of which was the glass piece, for the LCD with its ITO side, previously activated as described above, directly exposed to the cyanoacrylate vapor. After 10 second exposure, the plate was removed and buffed in one direction with paper tissue to form the lower plate of the device. A second similarly treated piece was placed with its buffing direction orthoganol to that at the lower plate in the well-known twisted nematic (TN) cell geometry, whilst spacing of the two plates was achieved with a 12 micrometer polyester gasket. The LCD, thus assembled, was held together by spring clips and capillary filled with the commercial nematic liquid crystal mixture known as E37 and available from BDH, Poole, Dorset, U.K. When the cell was viewed between crossed polarizers with the rubbing direction of the lower plate parallel to the optic axis of the bottom polarizer, light was transmitted/reflected uniformly across the cell through the crossed analyzer. On switching the cell with a 10 Vpp a.c. field applied as a sinewave at about 1 KHz, light was modulated through the cell, extinction occurring when switched on and transmission/reflection being observed when switched off.

Cells constructed using the same method for provision of the alignment layers, but having the rubbing directions in an antiparallel configuration when filled with E37 and viewed between crossed polarizers, appeared optically clear in transmission/reflection when the rubbing direction was held at 45° to the optic axis of the bottom polarizer.

Surface tilt angle measurement was performed using an optical interference technique similar to that proposed by Baur et al. (Baur, G., et al., Phy. Letts., 56A, 142, 1976) and an antiparallel cell geometry with regard to rubbing direction. Cells with alignment layers deposited as described in this Example gave surface tilts of 0.9°–1.1°.

EXAMPLE 2

Figure 1B:
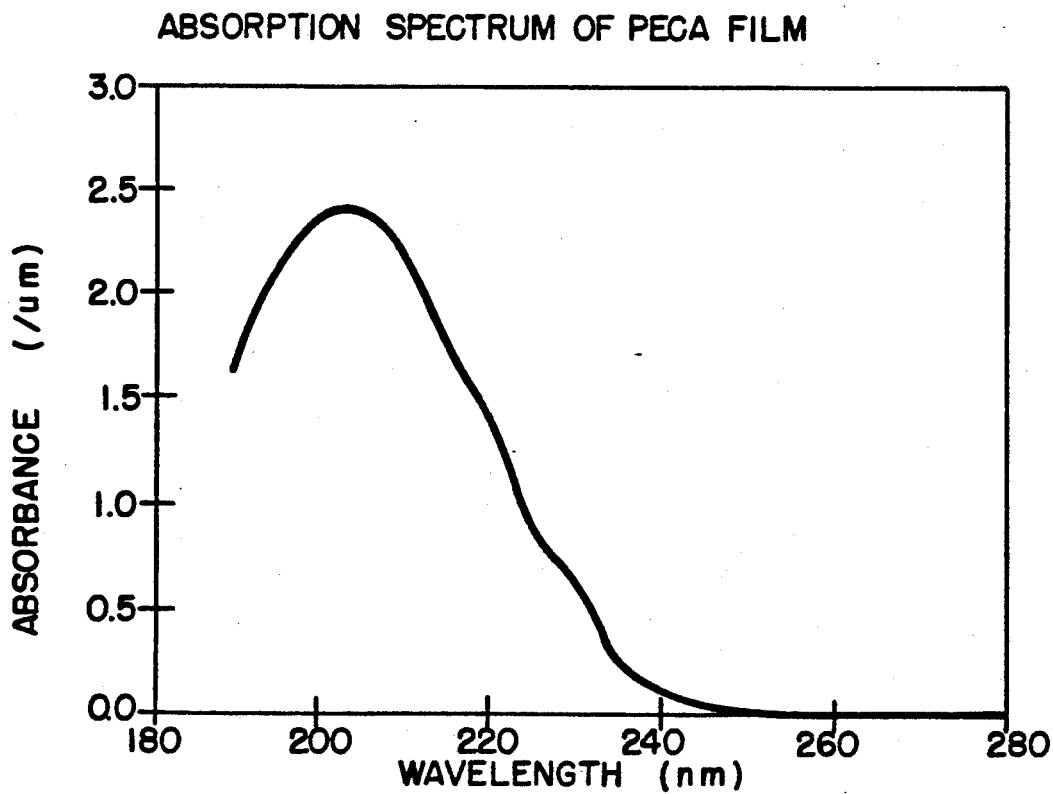
FIG. 1b is a diagram of the UV spectrum of a vapor-deposited layer of polyethylcyanoacrylate.
Figure 2:
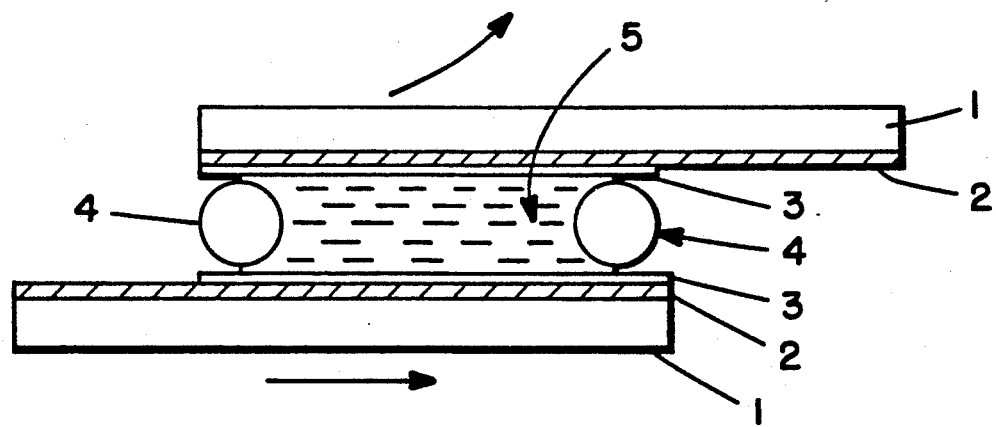
FIG. 2 is a diagrammatic cross section of an LCD device.

Cells were made up as described in Example 1 but the polycyanoacrylate deposited layer was exposed to 100 mW/cm² of UV light from a UVALOC ™ lamp for 10 seconds. Tilt angle measurements by the technique mentioned in Example 1 indicated surface tilts of 0.4°–0.8°. The emission spectrum for the UVALOC lamp is shown in FIG. 1a, together with the UV spectrum of a vapor-deposited layer on a quartz substrate (FIG. 1b). A quartz substrate was used in the standard test because it is transparent to UV light and therefore the layer could be irradiated through the substrate. This is equivalent to direct irradiation of the deposited alignment layer.

EXAMPLE 3

Cells were made up as described in Example 1, but the deposited layer was exposed to UV light as in Example 2, followed by heat treatment at about 250° C. for 5–10 seconds. Tilt angle measurements by the method indicated in Example 1 indicated surface tilts ranging from 5.4°–7.7°.

EXAMPLE 4

In order to establish the consequences of UV and UV/heat treatments, experiments were conducted to follow physical and chemical changes in the deposited films. Thus, an 11.95 mg polycyanoacrylate film was deposited onto a substrate; after 5 minutes UV irradiation, 5.43 mg remained and, from known density and geometric values, the film thus contracted in thickness from 2.1 micrometers to 0.98 micrometers. Such treatment was accompanied by changes in the IR spectrum, particularly in the regions 3,300–3,500 cm$^{-1}$, where new bands appeared after irradiation, and 1,700 cm$^{-1}$ and 1,250 cm$^{-1}$ regions.

The 0.98 micrometer film, supported by its substrate, was placed on a hot plate and the temperature brought up to 300° C. over the course of about 5 minutes and then removed. The new weight of film was 1.99 mg, corresponding to a 0.35 micrometer thickness of 16.6% by weight of the original as deposited film. The changes in the IR spectrum mentioned above were now much more pronounced and the film had also become slightly colored following the treatments.

EXAMPLE 5

Two sets of liquid crystal alignment layer coated electrodes are prepared in accordance with the methodology of Example 1 with the exception that 3-trimethylsilylpropyl-2-cyanoacrylate and allyl-2-cyanoacrylate are substituted for ethylcyanoacrylate. Thereafter, the coated electrodes are exposed to 100 mW/cm² of UV light from a UVALOC ™ lamp for about 10 seconds, followed by heat treatment at about 250° C. for 5–10 seconds. Cells prepared with said electrodes are expected to have high tilt angles.

Other modifications and variations to the present invention are possible and may be apparent to those skilled in the art in light of the above teachings. Thus, it is to be understood that such modifications and variations to the specific embodiments set forth herein are to be construed as being within the full intended scope of the present invention as defined by the appended claims.

We claim:

1. A method of forming a liquid crystal alignment layer having a tilt angle of at least about 5 degrees, said method comprising
   (i) coating a liquid crystal electrode with a polymer of a monomer of the formula IV:

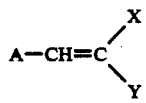

wherein A is —H or —CH=CH₂ or, provided that X and Y are both —CN, A may be —R² or —CH=CHR wherein R² is hydrocarbyl, aryl or alkaryl, and X and Y are strong electron withdrawing groups;
   (ii) exposing the polymer to UV irradiation of sufficient intensity and for a time period of from about 0.1 seconds to about 5 minutes to photochemically modify the polymer; and
   (iii) heating the modified polymer for at least about 5 seconds at from about 100° C. to about 400° C.

2. The method of claim 1 wherein the polymer coating is applied to the electrode as a polymer in solution by conventional spin-coating techniques.

3. The method of claim 1 wherein the polymer coating is applied to the electrode through vapor deposition of the monomer.

4. The method of claim 1 wherein X and Y are independently selected from —CN, —COR³, —COOR⁴, —SO₂R⁴ and —SO₃R⁴ wherein R³ is H, a hydrocarbyl group, an Si or Ti containing hydrocarbyl group or a hydrocarbyl group substituted with an Si or Ti containing group and R⁴ is a hydrocarbyl group, a substituted hydrocarbyl group, an Si or Ti containing hydrocarbyl or substituted hydrocarbyl group or a hydrocarbyl group or substituted hydrocarbyl group substituted with an Si or Ti containing group.

5. The method of claim 4 wherein R³ is a C₁–C₁₂ hydrocarbyl group.

6. The method of claim 4 wherein R⁴ is an unsubstituted, halo substituted or alkoxy substituted straight chain or branched chain C₁–C₁₂ alkyl group, a straight chain or branched chain C₂–C₁₂ alkenyl group, a straight chain or branched chain C₂–C₁₂ alkynyl group, a cycloalkyl group, an aralkyl group or an aryl group or any of the foregoing containing an Si or Ti atom or substituted with an Si or Ti containing group.

7. The method of claim 1 wherein X is —CN and Y is COOR⁴ and R⁴ is an unsubstituted, halo substituted or alkoxy substituted straight chain or branched chain C₁–C₁₂ alkyl group, a straight chain or branched chain C₂–C₁₂ alkenyl group, a straight chain or branched chain C₂–C₁₂ alkynyl group, a cycloalkyl group, an aralkyl group or an aryl group or any of the foregoing containing an Si or Ti atom or substituted with an Si or Ti containing group.

8. The method of claim 1 wherein A is —H, X is —CN and Y is —COOR⁵ wherein R⁵ is a C₁–C₅ alkyl or C₂–C₅ alkenyl group, or a group having at least one chiral center carbon atom.

9. The method of claim 4 wherein R³ or R⁴ comprises:

wherein $R^{2a}$, $R^{3a}$ and $R^{4a}$, which may be the same or different, are selected from H (provided that not more than one of $R^{2a}$, $R^{3a}$ and $R^{4a}$ is H), $C_1-C_{10}$ alkyl, aryl, $C_1-C_{10}$ alkoxy and siloxy groups of the formula:

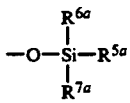

wherein $R^{5a}$, $R^{6a}$ and $R^{7a}$, which may be the same or different, are selected from H, $CH_3$ or phenyl, provided that not more than one of $R^{5a}$, $R^{6a}$ and $R^{7a}$ is H;
and wherein $R^{2a}$ may also be a group selected from siloxane oligomers or polymers of the structure:

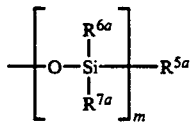

wherein $R^{5a}$, $R^{6a}$ and $R^{7a}$ are defined as above and m is 2 or 3, preferably 2; provided that the monomer with such substituent(s) has significant vapor pressure or can be heated to generate vapor pressure without decomposition.

10. The method of claim 4 wherein $R^3$ or $R^4$ is substituted with at least one group of the formula:

wherein $R^{2a}$, $R^{3a}$ and $R^{4a}$, which may be the same or different, are selected from H (provided that not more than one of $R^{2a}$, $R^{3a}$ and $R^{4a}$ is H), $C_1-C_{10}$ alkyl, aryl, $C_1-C_{10}$ alkoxy and siloxy groups of the formula:

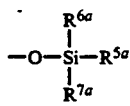

wherein $R^{5a}$, $R^{6a}$ and $R^{7a}$, which may be the same or different, are selected from H, $CH_3$ or phenyl, provided that not more than one of $R^{5a}$, $R^{6a}$ and $R^{7a}$ is H;
and wherein $R^{2a}$ may also be a group selected from siloxane oligomers or polymers of the structure:

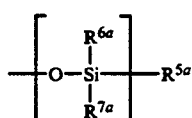

wherein $R^{5a}$, $R^{6a}$ and $R^{7a}$ are defined as above and m is 2 or 3, preferably 2; provided that the monomer with such substituent(s) has significant vapor pressure or can be heated to generate vapor pressure without decomposition.

11. The method of claim 1 wherein X is CN and Y is:

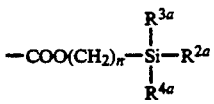

wherein n is 1-5 and $R^{2a}$, $R^{3a}$ and $R^{4a}$, which may be the same or different, are selected from H (provided that not more than one of $R^{2a}$, $R^{3a}$ and $R^{4a}$ is H), $C_1-C_{10}$ alkyl, aryl, $C_1-C_{10}$ alkoxy and siloxy groups of the formula:

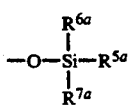

wherein $R^{5a}$, $R^{6a}$ and $R^{7a}$, which may be the same or different, are selected from H, $CH_3$ or phenyl, provided that not more than one of $R^{5a}$, $R^{6a}$ and $R^{7a}$ is H;
and wherein $R^{2a}$ may also be a group selected from siloxane oligomers or polymers of the structure:

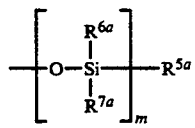

wherein $R^{5a}$, $R^{6a}$ and $R^{7a}$ are defined as above and m is 2 or 3, preferably 2; provided that the monomer with such substituent(s) has significant vapor pressure or can be heated to generate vapor pressure without decomposition.

12. The method of claim 11 wherein $R^{2a}$, $R^{3a}$ and $R^{4a}$ are $C_1-C_{10}$ alkyl and n is at least 3.

13. The method of claim 1 wherein the intensity of the UV lamp is about 100 $mW/cm^2$.

14. The method of claim 1 wherein the heat treatment is at a temperature of from about 200° C. to about 350° C.

15. The method of claim 1 wherein the heat treatment is at a temperature of from about 250° C. to about 350° C.

16. A liquid crystal display alignment layer on an electrode prepared in accordance with the method of claim 1.

17. The method of claim 1 further comprising the step of rubbing the polymer surface in order to orient the polymer.

18. A liquid crystal display device having at least one liquid crystal alignment layer prepared in accordance with the method of claim 17.

19. The liquid crystal display device of claim 18 wherein the monomer is of the formula:

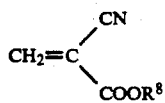
wherein $R^8$ is a $C_1$–$C_{12}$ alkyl group, a $C_1$–$C_{12}$ alkenyl group or either of the foregoing containing an Si or Ti atom or substituted with an Si or Ti containing group.
20. The method of claim 1 wherein the so formed liquid crystal alignment layer is subsequently rubbed in order to impart orientation characteristics to the alignment layer.
* * * * *